Figure 1:
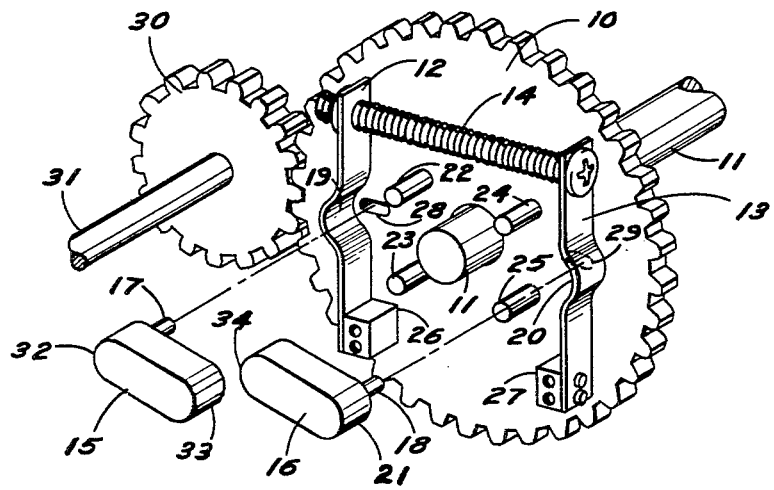

May 31, 1960 W. F. WILLIAMS 2,938,613
RESETTING SLIP CLUTCH, TORQUE OPERATED
Filed Sept. 29, 1958

INVENTOR.
WINSTON F. WILLIAMS
BY *Morris Moody*
ATTORNEY
*R W Anderson*
AGENT

United States Patent Office 2,938,613
Patented May 31, 1960

2,938,613

RESETTING SLIP CLUTCH, TORQUE OPERATED

Winston F. Williams, Cedar Rapids, Iowa, assignor to Collins Radio Company, Cedar Rapids, Iowa, a corporation of Iowa Filed Sept. 29, 1958, Ser. No. 763,930

5 Claims. (Cl. 192—56)

This invention relates generally to clutches and more particularly to a torque-operated slip clutch.

Slip clutches of the torque-friction type are widely employed in driving means wherein it is desired to disengage a driven member from a driving means upon a predetermined torque requirement being reached. Commonly employed devices of this type include frictionally-engaging clutch discs which effect a coupling drive until a predetermined torque is exerted, at which point the engaging surfaces slip with respect to one another. These commonly employed types of slip clutches have the disadvantage of requiring an undesirable expenditure of energy in the slipping operation and thus in multiple drive applications, the driving means, such as a motor, must be of sufficient capacity to provide the torque consumed in slipping operations. This becomes particularly important in shaft positioning applications employing Autotune devices, for example, wherein a single driving motor is commonly employed to furnish the driving torque to a multiple of output shafts through intermediate shaft positioning control mechanisms which each include a slip clutch. Autotune devices, see for example Patent No. 2,546,980 to Arthur A. Collins, function to precisely position shafts to preselected positions and include in their operating mechanisms notched cam and pawl mechanisms, whereby once the desired output shaft position is attained the output shaft is locked and the driving motor providing the operating torque may continue to run. In these instances, slip clutches are inserted between the driving motor and the positioning mechanisms to enable continued motor operation when the output is locked in position. Ofttimes, in the application of Autotune devices, a single drive motor might be employed to operate a plurality of Autotune devices which reach their desired positions at different time intervals. It becomes necessary in these cases for the drive motor to supply the power consumed in slip-clutch operations in one or more Autotune devices while continuing to furnish power to further position added Autotune units in the installation. In this instance it is apparent that the drive motor must be of sufficient size to not only position the units, but to additionally provide the driving power which is consumed in slip-clutch operations.

The present invention has as an object, therefore, the provision of a torque-operated slip clutch whereby the desired slipping action is attained between driving means and driven member, but wherein the torque requirements, once the activating torque level is reached, are greatly reduced and may be made to approach a negligible requirement.

A further object of this invention is to provide a simple torque-operated slip clutch wherein resetting is automatically realized upon a reversal of the torque applied by the driving member. This feature finds especial useage in the above-referenced Autotune device applications wherein, inherently, the Autotune devices initially are rotated in a predetermined direction to a "home" position and through suitable control circuitry are then driven in the reverse direction towards the preselected and desired end position of the driven member. The slip clutch of the present invention may readily be inserted between the driving motor and the Autotune mechanism and may effect the desired slipping disengagement between the motor drive and the driven elements when the Autotune mechanism is locked in its desired position. Due to the design of the present slip clutch, the torque requirements for an Autotune device installation would be negligible for those slip clutches which have reached their disengaged condition. Thus in the above-referenced Autotune device applications employing a single drive motor for a multiple of Autotune device mechanisms, a considerably smaller motor may be employed than has heretofore been possible.

A still further object of the present invention is the provision for a torque-operated slip clutch employing a minimum of parts and wherein simplified means are employed for adjusting the action of the clutch.

The invention is featured in the provision of spring-loaded pawls carried in diametrically-opposed frictional engagement with a shaft member whereby a slipping action is effected for one direction of relative rotation between the pawl members and the shaft and a positive drive is effected for the opposite direction of rotation and wherein the communication between said pawls and shaft is such that upon reaching a predetermined torque requirement between the pawl carrying member and the shaft a toggle action is effected and the positive drive and slipping actions are respectively reversed.

Figure 2:
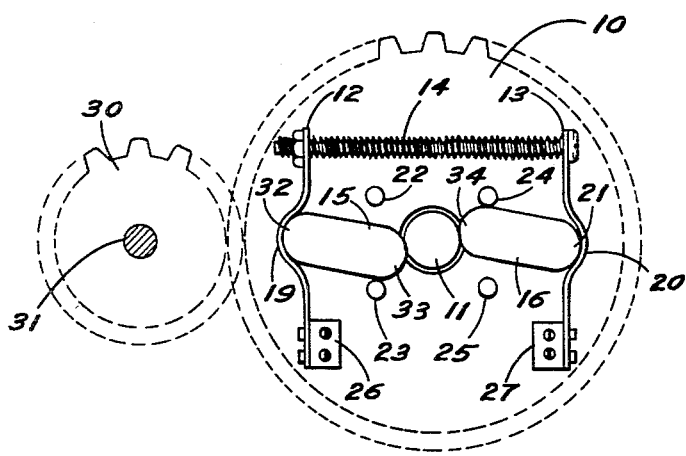

These and other features and objects of the invention will become apparent upon reading the following description and claims in conjunction with the accompanying drawings, in which:

Figure 1 illustrates an isometric view of one embodiment of the present invention; and Figure 2 is a plan view of the assembled clutch mechanism shown with the pawls positioned for clockwise positive drive as viewed.

With reference to Figure 1, a gear member 10 is seen to be rotatably mounted on shaft 11. A second gear member 30 is in peripheral driving engagement with gear member 10 and rigidly affixed to a second shaft 31. Shafts 11 and 31 in the embodiment illustrated may serve as either input or output drive members, the operating principle of the clutch mechanism remaining unchanged in either case. By the mechanism to be described, a positive drive action is effected between shafts 31 and 11 in a first rotational direction until a predetermined torque is realized, at which point a slipping action is effected between shafts 31 and 11 in the same direction of rotation and a positive drive action is automatically effected in the reverse direction of torque application.

With reference to Figure 2, gear member 10 has mounted thereon a pair of pawl spring biasing members 12 and 13 having first ends thereof rigidly affixed to the gear member 10 by means of dogs 26 and 27. The other ends of the spring members 12 and 13 may be adjustably drawn toward one another by means of an adjustable screw 14. Springs 12 and 13 are formed with centrally-located annular depressions 19 and 20 which are symmetrically and diametrically disposed with respect to gear member 10. A first drive pawl 16 is peripherally mounted on the surface of gear plate 10 by means of a pin 18 and slot 29 formed through gear member 10. The end 21 of pawl 16 is rounded so as to conform with the annular depression 20 in pawl spring member 13. As illustrated in Figure 2, the opposite end 34 of pawl 16 is seen to be spring loaded into tangential peripheral engagement with shaft 11 and a retaining pin 24, which pin extends transversely from the surface of gear member 10. Similarly, a second pawl 15 has a first end 32 of rounded configuration which is cooperatively received in the annular depression 19 in spring member 12 and the pawl 15 is pivotally and slideably mounted with respect to the gear member 10 by means of a pin member 17 which is received in a slot 28 formed in the gear member. The pivot points of the pawls 15 and 16 are thus seen to be diametrically opposed with respect to the shaft 11 and it is noted that pawl 15 is urged into peripheral spring-loaded engagement at a point on shaft 11 diametrically opposing the engaging point of pawl 16. Pawl 15 is similarly urged in this spring-loaded engagement by means of a second retaining pin 23 extending transversely from the surface of the gear member 10. The position of pawls 15 and 16 with respect to shaft 11 illustrated in Figure 2 is such that a positive drive action is effected between gear member 10 and shaft 11 upon application of a clockwise torque to the shaft 11. This positive drive action is effected due to the frictional engagement between the ends 33 and 34 of pawls 15 and 16 respectively and the periphery of shaft 11. Now considering the application of a clockwise torque on shaft 11, should gear member 10 be held rigid or the torque requirement on a load being driven by gear member 10 exceed a predetermined value, the continued application of a clockwise torque on shaft 11 will exert a force on the pawls 15 and 16 by which they are forced radially outwardly from the axis of shaft 11 against the retaining spring bias of spring members 12 and 13. Due to the configuration, pawl members 15 and 16 simultaneously pivot and the pivoting action is possible due to the elongated radially extending and diametrically disposed slots 28 and 29 into which the pawl pivot pins 17 and 18 are received. It is seen that the positive drive action with application of clockwise torque to shaft 11 is effected until the ends 33 and 34 of the pawl members 15 and 16 are forced to pivot such that they engage shaft 11 at diametrically-opposed points along the longitudinal axis of the pivot slots 28 and 29. Continued application at this point of clockwise torque on shaft 11 causes the ends 33 and 34 of pawls 15 and 16 to toggle with a snap-like action into spring-loaded confinement with shaft 11 and second and third retaining pins 22 and 25 extending transversely from the surface of gear member 10. With the pawls in this opposite position, the frictional force between the pawl members and the shaft 11 is no longer sufficient to effect a positive drive and shaft 11 slips with respect to the ends 33 and 34 of the pawls 15 and 16. Thus for continued clockwise rotation of shaft 11, the gear member 10 is effectively disconnected. Now upon the application of an opposite counterclockwise torque to shaft 11 and with the pawls in the opposite position from that illustrated in Figure 2, it is seen that a positive drive is effected in the reverse direction of rotation until a predetermined torque requirement is reached, at which time, the pawl members 15 and 16 are similarly forced to ride up and over the shaft 11 and are toggled into the reverse position to once again effect a slipping arrangement with the shaft 11. The predetermined torque at which the toggle action of the pawls is initiated may readily be adjusted by changing the pressure exerted by springs 12 and 13 against the pawls, that is, by adjusting the pressure exerted by the pawl ends 33 and 34 against the periphery of the shaft 11. A screw member 14 is provided for this purpose and by adjustment of the screw 14, the free ends of the pawl springs 12 and 13 may be drawn inwardly to exert a greater pressure against the pawls 15 and 16 as desired.

The above slip clutch drive action has been described with respect to a driving torque being applied to shaft 11 and this force being coupled to gear member 10. However, either gear member 10 or shaft 11 may be the driving member without affecting the cooperation between the pawls and shaft 11. Thus shaft 11 might be considered a drive motor shaft and gear member 10 considered to be the output drive by which a driven member is to be positioned; or, alternatively, shaft 31 might be considered to be a drive motor shaft with shaft 11 connected to a driven member. In the latter case, the consideration of positive drive and slipping action with respect to directions of torque application from the drive motor would be reversed, that is to say, if one considered the input torque to be applied to gear member 10, with the pawl positions illustrated in Figure 2, a positive drive would be realized in the clockwise direction and a slipping engagement between gear plate 10 and shaft 11 would be realized for the application of counterclockwise torque to gear member 10.

The present invention thus provides a torque-operated slip clutch mechanism requiring relatively few components which is simple in construction and adjustment and that further automatically resets itself for positive drive with the alternate application of clockwise and counterclockwise torques of sufficient magnitude to effect action of the clutch.

Although this invention has been described with respect to a particular embodiment thereof, the invention is not to be so limited as changes and modifications may be made therein which are within the full intended scope thereof as defined by the appended claims.

I claim:

1. A torque-activated slip clutch comprising a pawl-carrying plate member rotatably mounted concentrically about a shaft member, a pawl having one end thereof pivotally mounted on said plate member and additionally radially displaceable thereon with respect to the axis of said shaft, pawl retaining means rigidly affixed to said plate member on either side of the radial extending from said shaft axis to the pivot axis of said pawl and means for spring biasing said pawl with respect to said shaft, the other end of said pawl urged into retained peripheral frictional engagement with a point on said shaft circumferentially displaced from said radial extending from said shaft axis to the pivot axis of said pawl.

2. A torque-activated slip clutch comprising a pawl-carrying plate member rotatably mounted concentrically about a shaft member, a pair of pawls having first ends thereof pivotally mounted at diametrically opposed pivot points on said plate member, each of said pawls additionally radially displaceable upon said plate member with respect to the axis of said shaft, a pair of pawl retaining means rigidly affixed to said plate member on either side of the radials extending from said shaft axis to the pivot axes of said pawls and means for spring biasing said pawls with respect to said shaft, the other ends of said pawls urged into retained diametrically opposed frictional engagement with points on the periphery of said shaft, said points being circumferentially displaced from the radials extending from said shaft axis to the pivot axes of said pawls.

3. A torque-activated slip clutch comprising a pawl-carrying plate member rotatably mounted concentrically about a shaft member, a pair of pawls having first ends thereof pivotally mounted at diametrically opposed pivot points on said plate member and the other shaft-engaging ends thereof formed as generally annular configurations, each of said pawls additionally radially displaceable upon said plate member with respect to the axis of said shaft, a pair of pawl retaining pins rigidly affixed to said plate member on either side of the radials extending from said shaft axis to the pivot axes of said pawls, and spring biasing means communicating with the first ends of said pawls and urging said pawls radially inwardly toward the axis of said shaft, the second ends of said pawls urged into retained diametrically opposed tangential frictional engagement with points on the periphery of said shaft circumferentially displaced from the radials extending from said shaft axis to the pivot axes of said pawls.

4. A torque-activated slip clutch comprising a pawl-carrying plate member rotatably mounted concentrically about a shaft member, a pair of pawls each having pivot pins affixed transverse to first ends thereof, said pivot pins pivotally received in diametrically opposed radially extending elongated slots in said plate member, a pair of space-separated pawl retaining pins rigidly affixed to said plate member on either side of the radials extending from said shaft axis to the pivot axes of said pawls, a pair of leaf spring members mounted on said plate member each formed with an annular depression therein disposed symmetrically with respect to and radially outwardly from one of said elongated slots, and the first ends of said pawls received in said annular spring depressions, the other ends of said pawls urged into retained diametrically opposed frictional engagement with points on the periphery of said shaft, said points being circumferentially displaced from the radials extending from said shaft axis to the pivot axes of said pawls.

5. A torque-activated slip clutch comprising a pawl-carrying plate member rotatably mounted concentrically about a shaft member, a pair of pawls each having pivot pins affixed transverse to first ends thereof, said pivot pins pivotally and slideably received in diametrically opposed radially extending elongated slots in said plate member, a pair of space-separated pawl retaining pins rigidly affixed to said plate member on either side of the radials extending from said shaft axis to the pivot axes of said pawls, a pair of leaf spring members having first ends thereof rigidly affixed to said plate member, each of said spring members formed with an annular depression therein disposed symmetrically with respect to and extending radially outwardly from one of said elongated slots, the first ends of said pawls received in said annular spring depressions, the other ends of said pawls urged into retained diametrically opposed frictional engagement with points on the periphery of said shaft, said points being circumferentially displaced from the radials extending from said shaft axis to the pivot axes of said pawls, and means cooperating with the second ends of said spring members to selectively adjust the spacing therebetween.

References Cited in the file of this patent

UNITED STATES PATENTS

| | | |
|---|---|---|
| 362,767 | McNair | May 10, 1887 |
| 512,148 | Binger | Jan. 2, 1894 |
| 1,005,182 | Fellows | Oct. 10, 1911 |
| 2,255,211 | Gebert | Sept. 9, 1941 |

FOREIGN PATENTS

| | | |
|---|---|---|
| 187,142 | Great Britain | Oct. 19, 1922 |
| 324,877 | Great Britain | Feb. 6, 1930 |